(12) United States Patent
Poon

(10) Patent No.: US 7,127,404 B1
(45) Date of Patent: Oct. 24, 2006

(54) METHOD AND APPARATUS FOR A DUAL ONLINE REGISTRATION CONTACT INFORMATION SYSTEM

(75) Inventor: Alex Poon, Los Altos Hills, CA (US)

(73) Assignee: eBay, Incorporated, San Jose, CA (US)

( * ) Notice: Subject to any disclaimer, the term of this patent is extended or adjusted under 35 U.S.C. 154(b) by 786 days.

(21) Appl. No.: 09/569,331

(22) Filed: May 11, 2000

(51) Int. Cl.
*G06Q 99/00* (2006.01)

(52) U.S. Cl. .............................. 705/1; 707/3

(58) Field of Classification Search ............. 705/37, 705/14, 1, 26, 39; 395/186; 709/200, 206; 707/3, 4, 5, 10
See application file for complete search history.

(56) References Cited

U.S. PATENT DOCUMENTS 5,822,529 A    10/1998   Kawai 6,247,043 B1 *  6/2001   Bates et al.
2001/0011247 A1 * 8/2001   O'Flaherty et al.

OTHER PUBLICATIONS

[ebay] Company Overview, Aug. 27, 2002, http://pages.ebay.com/community/aboutebay/overview/index.html.*
[ebay] Press Release, Oct. 15, 1998 http://pages.ebay.com/community/aboutebay/releases/pr98.html#5.*

* cited by examiner

*Primary Examiner*—Mary Cheung
(74) *Attorney, Agent, or Firm*—Synnestvedt & Lechner LLP; Gregory S. Bernabeo (57) ABSTRACT

A method and apparatus are described for a dual online registration contact information system, comprising receiving a request for contact information for a given user, searching a user contact information database comprising private contact information and public contact information to determine if the given user has associated public contact information, and displaying the given user's public contact information.

16 Claims, 9 Drawing Sheets

| Enter your private contact information ||
|---|---|
| E-mail address | (required)<br>Note: Enter your valid email address - including your "@serviceprovider.com" domain. For example, if your AOL screen name is joe cool, your email address is joecool@aol.com |
| Full name<br>e.g., John H. Doe | (required)<br>First M. Last |
| Company | (optional) |
| Address | (required) |
| City | (required) |
| State | (required) |
| Zip | |
| Primary phone # | (   )   -   Extension:   (required) |
| Secondary phone # | (   )   -   Extension:   (required) |
| Promotional Priority Code<br>(if applicable) | (optional)<br>Note: If you do not have a promotional priority code or do not know what one is, please skip this question. |
| How did you first hear about eBay? | (optional) |

*FIG. 5A*

| Enter your public contact information (optional) ||
|---|---|
| E-mail address | Note: Enter your valid email address - including your "@serviceprovider.com" domain. For example, if your AOL screen name is joe cool, your email address is joecool@aol.com |
| Full name<br>e.g., John H. Doe | First M. Last |
| Company | |
| Address | |
| City | |
| State | |
| Zip | |
| Primary phone # | (    )    -           Extension: |
| Secondary phone # | (    )    -           Extension: |
| Promotional Priority Code<br>(if applicable) | Note: If you do not have a promotional priority code or do not know what one is, please skip this question. |
| How did you first hear about eBay? | |

| Enter your contact information ||
|---|---|
| E-mail address | (required)<br>Note: Enter your valid email address - including your "@serviceprovider.com" domain. For example, if your AOL screen name is joe cool, your email address is joecool@aol.com |
| Full name<br>e.g., John H. Doe | (required)<br>First M. Last |
| Company | (optional) |
| Address | (required) |
| City | (required) |
| State | (required) |
| Zip | (required) |
| Primary phone # | (   )    -       Extension:      (required) |
| Secondary phone # | (   )    -       Extension:      (required) |
| Promotional Priority Code<br>(if applicable) | (optional)<br>Note: If you do not have a promotional priority code or do not know what one is, please skip this question. |
| How did you first hear about eBay? | (optional) |

*FIG. 7*
*(Prior Art)*

METHOD AND APPARATUS FOR A DUAL ONLINE REGISTRATION CONTACT INFORMATION SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to the field of privacy in electronic commerce (e-commerce), and, more specifically, to an apparatus and a method for an online registration system that provides a user with the option of providing public contact information in addition to private contact information.

BACKGROUND OF THE INVENTION

The emergence of electronic commerce has revolutionized the processing of transactions between retailers and consumers. What some believe to be advantages of retail-based e-commerce transactions, such as the elimination of person-to-person contact, are undermined by the need to provide personal and private information that would otherwise be unnecessary in conventional retail-based transactions.

In an Internet-based transaction, customers must provide retailers with information, such as the customer's address, phone number, and credit card information in order to have goods delivered. Although this information is essential to the completion of an Internet-based transaction, this information is useful by retailers in other applications, as well. For example, a buyer's personal information is often used on e-commerce auction websites for the purpose of providing a seller reasonable assurance that a sale will be made, and that a buyer's inquiry is not merely frivolous. This process encourages sellers to register their information on the particular website.

In these types of applications, however, the dissemination of personal information is not essential to the base sales transaction. As a result, the dissemination of this information should be much more restricted. In eBay.com's auction website, for example, both buyers and sellers must register their information with the website in order to participate in an auction. In an eBay.com auction, any registered user (buyer or seller) can request contact information of another registered user (buyer or seller). When this information is requested, eBay.com sends the name, city, state, country, zip code, and phone number of the other user. The information is taken from information that the user provides when he or she registers. For example, the user's name, city, state, country, zip code, and phone number are taken directly from the name, city, state, country, zip code, and phone number fields provided on the website's registration page.

Although the user's mailing address is not provided (for security reasons), it does not give the user the choice to opt out of providing the information, or of providing alternate information. Currently, the user must provide the information, or lose the right to participate in auctions.

SUMMARY OF THE INVENTION

An apparatus and method are described for a dual online registration contact information system, comprising receiving a request for contact information for a given user, searching a user contact information database comprising private contact information and public contact information to determine if the given user has associated public contact information, and displaying the given user's public contact information.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 3:
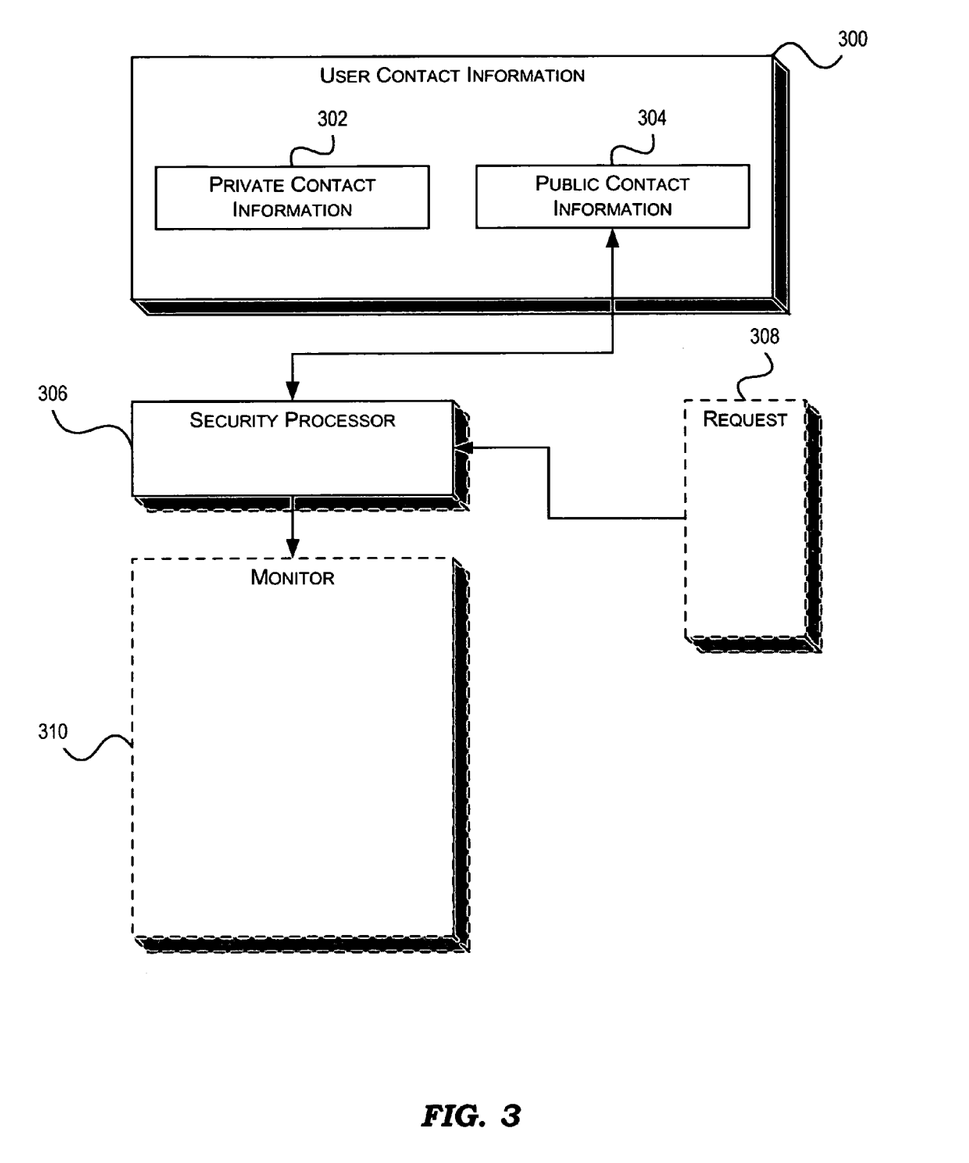
FIG. 3 illustrates a dual online registration contact information system.

Generally, a dual online registration contact information system (FIG. 3) is described, comprising user contact information 300 which comprises private contact information 302 and public contact information 304; and security processor 306 for determining if public contact information exists for a given user, for retrieving the public contact information, and for displaying on a monitor 310 (or equivalent thereof) the public contact information, all in response to a request for contact information for the given user 308.

Also described is a dual online registration contact information method (FIG. 4) comprising prompting a user for private contact information 400; prompting a user for public contact information 402; storing the public and private contact information in a contact information database 404; receiving a request for user contact information for a given user 406; determining if the given user has public contact information 408; displaying the user's public contact information if it exists 412.

Introduction

Figure 1:
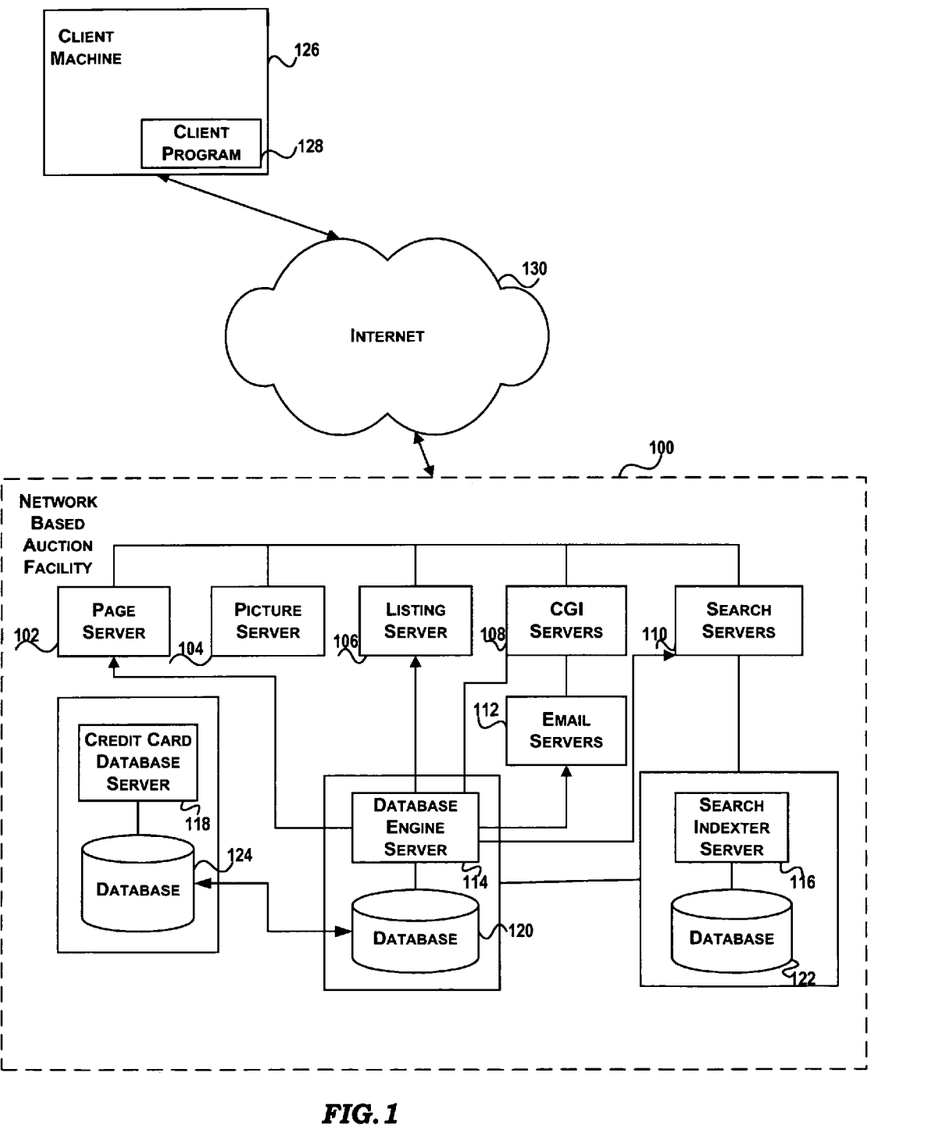
FIG. 1 is a block diagram illustrating an exemplary network-based transaction facility in the form of an Internet-based auction facility.

FIG. 1 is a block diagram illustrating an exemplary network-based transaction facility in the form of an internet-based auction facility 100. While an exemplary embodiment of the present invention is described within the context of an auction facility, it will be appreciated by those skilled in the art that the invention will find application in many different types of computer-based, and network-based commerce facilities.

The auction facility 100 includes one or more of a number of types of front-end servers, namely page servers 102 that deliver Web pages (e.g., markup language documents), picture servers 104 that dynamically deliver images to be displayed within Web pages, listing servers 106, CGI (Common Gateway Interface) servers 108 that provide an intelligent interface to the back-end of facility 100, and search servers 110 that handle search requests to the facility 100. E-mail servers 112 provide, inter alia, automated e-mail communications to users of the facility 100.

The back-end servers include a database engine server 114, a search index server 116, and a credit card database server 118, each of which maintains and facilitates access to a respective database 120, 122, 124.

The internet-based auction facility 100 may be accessed by a client program 128, such as a browser (e.g., the Internet Explorer distributed by Microsoft Corp. of Redmond, Wash.) that executes on a client machine 126 and accesses the facility 100 via a network such as, for example, the Internet 130. Other examples of networks that a client may utilize to access the auction facility 100 include a wide area network (WAN), a local area network (LAN), a wireless network (e.g., a cellular network), or the Plain Old Telephone Service (POTS) network.

Figure 2:
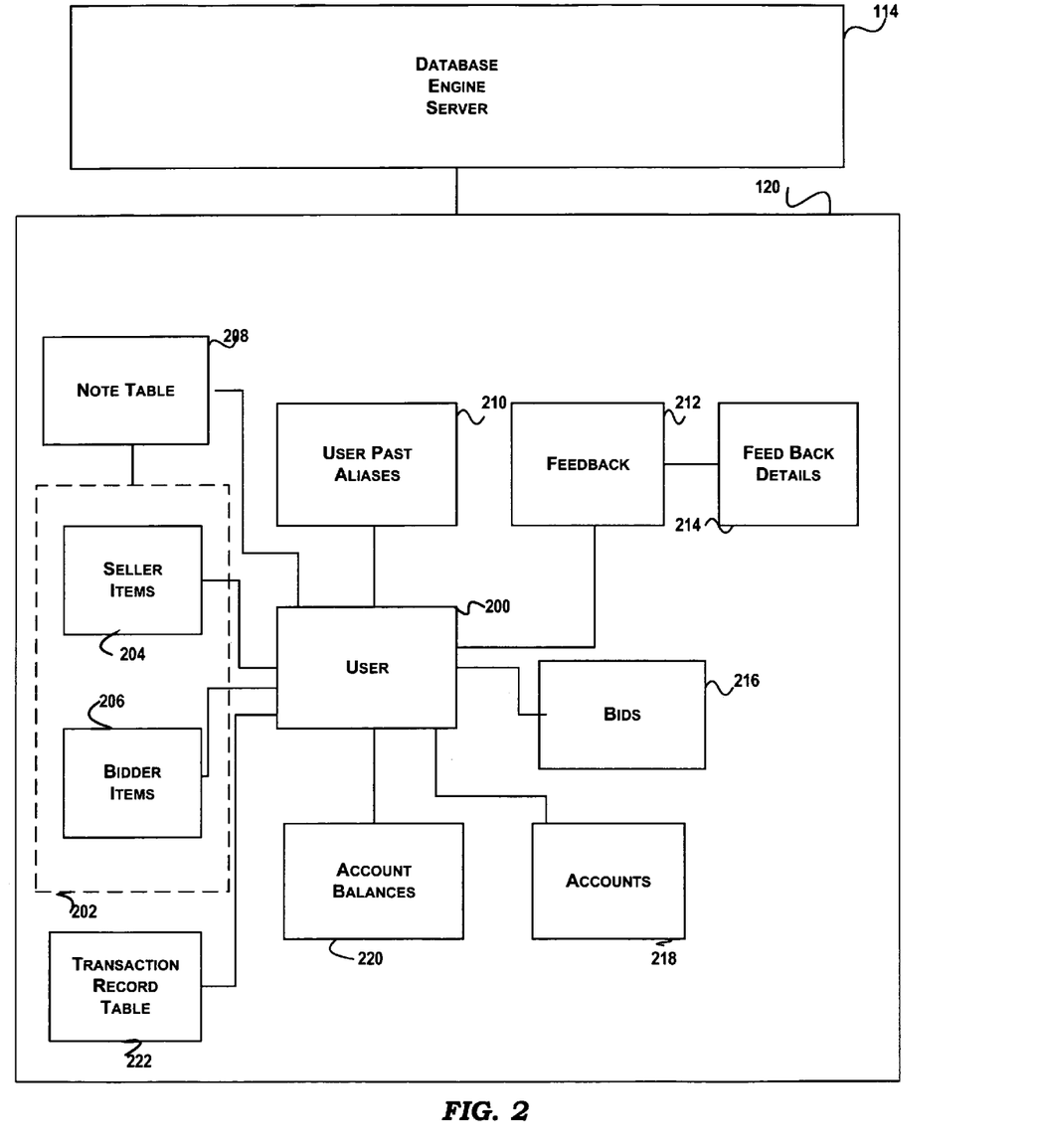
FIG. 2 is a database diagram illustrating an exemplary database for the transaction facility.

FIG. 2 is a database diagram illustrating an exemplary database 120, maintained by and accessed via the database engine server 114, which at least partially implements and supports the auction facility 100. The database 120 may, in one embodiment, be implemented as a relational database, and includes a number of tables having entries, or records, that are linked by indices and keys. In an alternative embodiment, the database 120 may be implemented as a collection of objects in an object-oriented database.

Central to the database 120 is a user table 200, which contains a record for each user of the auction facility 100. A user may operate as a seller, buyer, or both, within the auction facility 100. The database 120 also includes item tables 202 that may be linked to the user table 200. Specifically, the item tables 202 include a seller items table 204 and a bidder items table 206. A user record in the user table 200 may be linked to multiple items that are being, or have been, auctioned via the facility 100. A link indicates whether the user is a seller or a bidder (i.e., buyer) with respect to items for which records exist within the item tables 202. The database 120 also includes a note table 208 populated with note records that may be linked to one or more item records within the item tables 202 and/or to one or more user records within the user table 200. Each note record within the note table 208 may include, inter alia, a comment, description, history or other information pertaining to an item being auctioned via the auction facility 100, or to a user of the auction facility 100.

A number of other tables are also shown to be linked to the user table 200, namely a user past aliases table 210, a feedback table 212, a feedback details table 214, a bids table 216, an accounts table 218, an account balances table 220, and a transaction record table 222.

The apparatus and method of the present invention are preferably implemented in an online registration page for a website auction, such as eBay.com of eBay™ Inc. of San Jose, Calif. Under existing systems, a website auction user registers to participate in an auction hosted by the website as a buyer or as a seller for any given auction at the user's option. During the registration process, the user is asked to enter his or her contact information (FIG. 6, 600), such as the user's e-mail address, name, address, city, state, zip code, primary phone number, secondary phone number, and promotional priority code (FIG. 7). The user's e-mail address, name, address, city, state, zip code, and primary phone number are all required fields. Once the user enters the contact information, the information is stored in an eBay-.com auction database (FIG. 6, 602).

Figure 6:
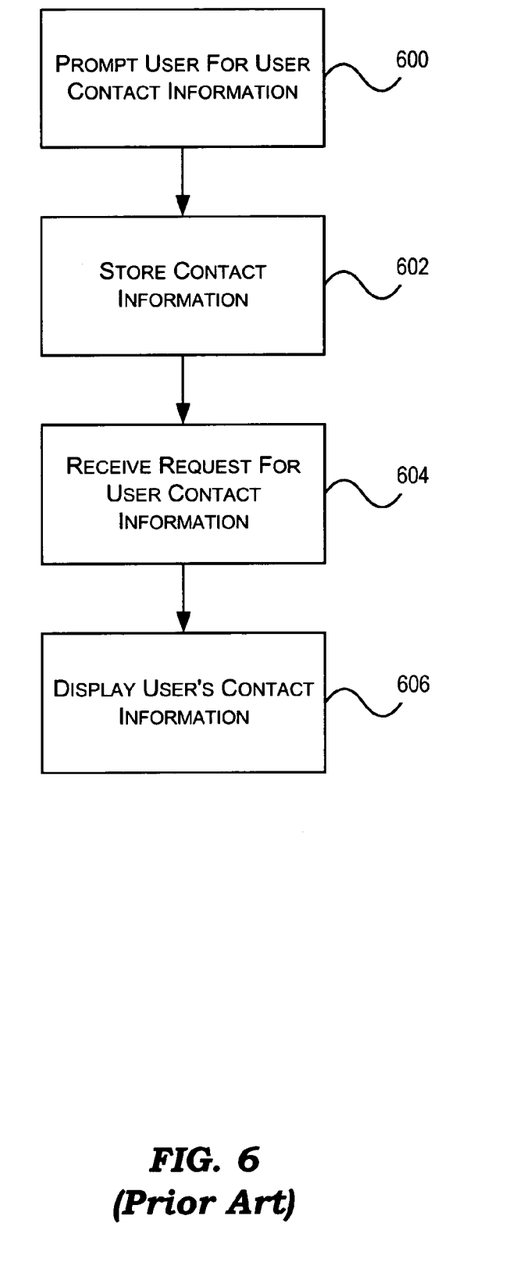
FIG. 6 illustrates a method for a prior art online registration contact information system.
Figure 7:
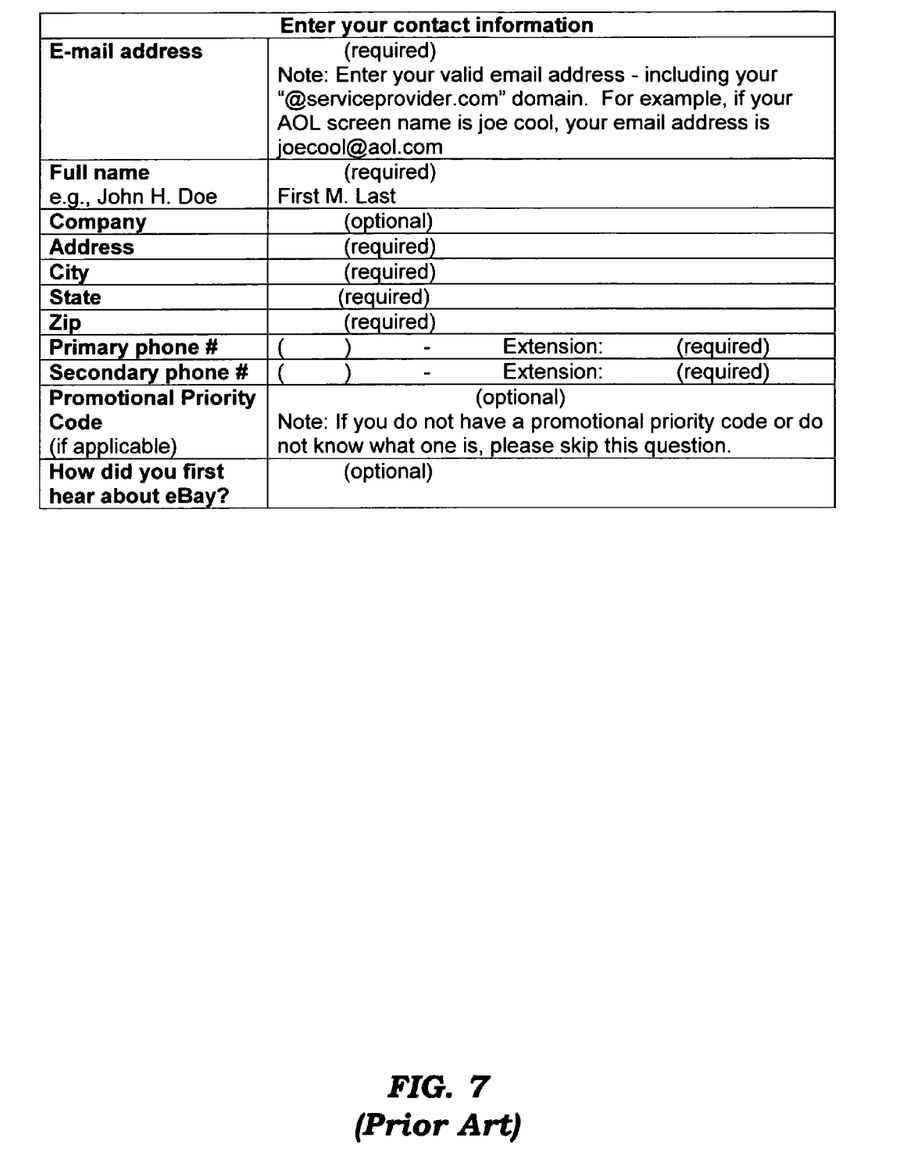
FIG. 7 is a screen capture representation of a prior art online registration contact information system.

Once a user registers, the user can request "Contact Information" about another registered eBay user (FIG. 6, 604). A registered user that requests information about another registered user (requesting user) is asked to supply his or her "User ID" and "Password", as well as the "User ID" of the other registered user. While "Contact Information" on eBay is defined as "information provided by eBay users when they register, including name, address, and phone number", the information that is actually displayed to the requesting user is the other user's name e-mail address, user ID, name, company, city, state, country, zip code, phone number, and date and time of registration (FIG. 6, 606). A user, however, may not want all or any of this information published.

One solution to this would be to allow a user to opt out of having any information published, or to allow a user to select only those fields that the user wants published. Both options, however, would be overly restrictive for users who want some of the information published, or for users who want other information published. A need exists, therefore, for a versatile utility in which a user can both opt out of providing any information, as well as provide selected, or desired information.

Requesting User Information

A dual online registration contact information system changes the user registration process. In a dual online registration contact information system, a website auction user is asked to enter his or her private contact information (FIG. 4, 400), such as the user's e-mail address, name, address, city, state, zip code, primary phone number, secondary phone number, and promotional priority code (FIG. 5A) during the registration process. The user's e-mail address, name, address, city, state, zip code, and primary phone number are all required fields. This area is where a user would enter information such as the user's shipping address or payment address, or any other address that helps to facilitate the completion of a transaction, such as the user's contact number.

Figure 4:
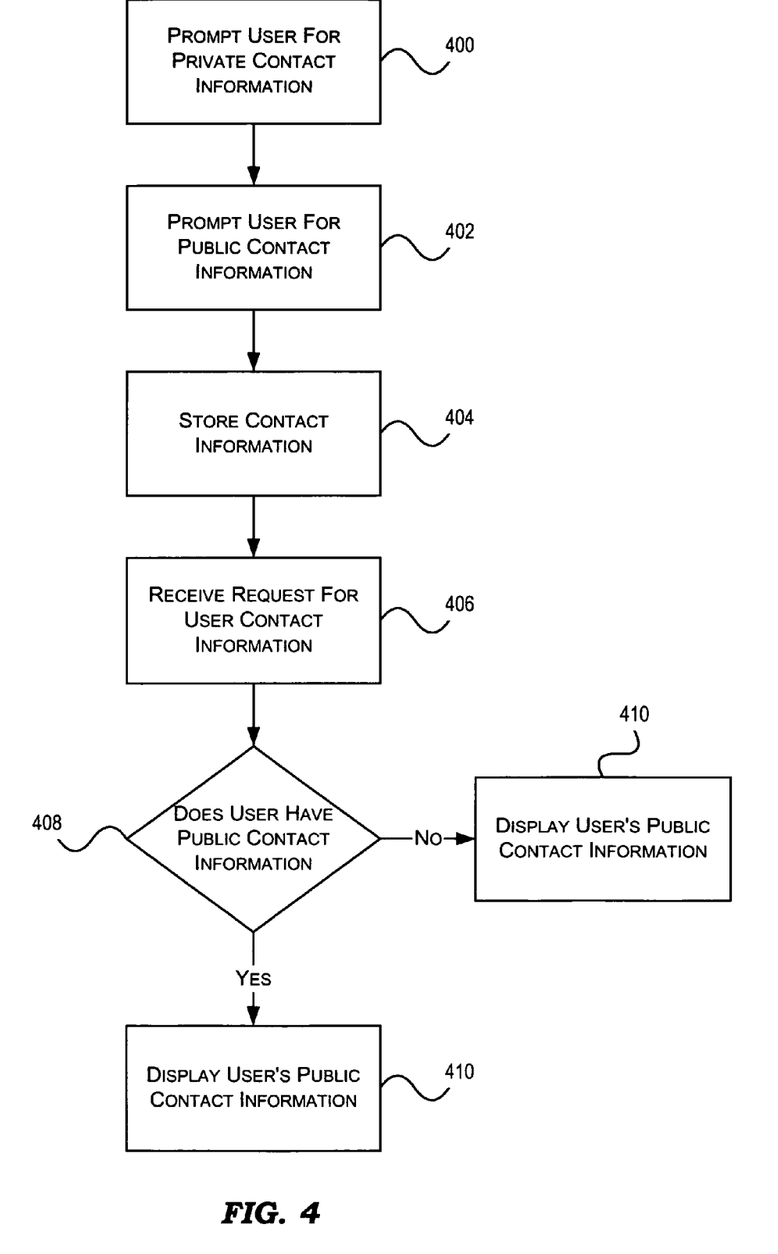
FIG. 4 is a flowchart illustrating an exemplary method for dual online registration contact information in preferred embodiments of the present invention.

A user is also presented with the option of entering public contact information (FIG. 4, 402). Preferably, this information includes the same information asked for in the private contact information (i.e., the user's e-mail address, name, address, city, state, zip code, primary phone number, secondary phone number, and promotional priority code). FIG. 5B. In the public contact information field (or fields), the user can enter an alternate address, such as a post office box, voice mail number, or other information of an impersonal nature.

Once the user enters the private and, if any, public contact information, the information is stored in a database (FIG. 4, 404). When a registered user requests "Contact Information" about another registered user on eBay (FIG. 4, 406), the user's public contact information is searched to determine if that user has public contact information (FIG. 4, 408). If no public contact information exists for that user, then no contact information is displayed for that user (FIG. 4, 410). However, if public contact information is found for that user, then that user's public contact information is displayed to the requesting user (FIG. 4, 412). In this way, the user's regular, or private contact information is not divulged unless and until the user makes a sell or a purchase. For example, a user transacting as a buyer could enter his or shipping address in private contact information, and his or her e-mail in public contact information so that when user contact information for that user is requested, only the user's e-mail address will be published. The seller is protected in that the seller has reasonable assurance that the buyer is a serious buyer, and can have some recourse if the buyer fails to perform. Additionally, the buyer is protected in that the buyer can still participate in the auction without having to divulge personal contact information. Preferably, the publicly displayed contact information includes a user's e-mail address, name, address, city, state, zip code, and primary phone number.

Dual Online Registration Contact Information

Figure 5A:
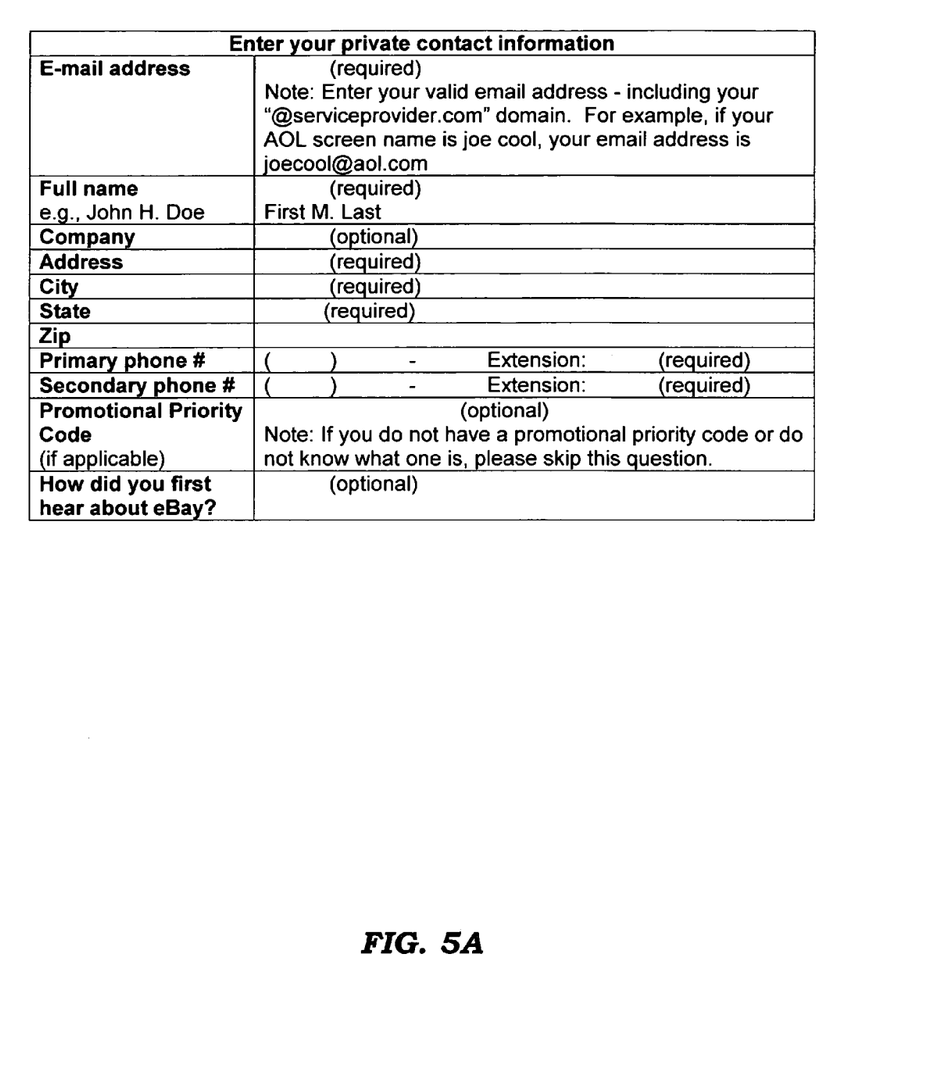
FIGS. 5A, 5B, and 5C are screen capture representations of a dual online registration contact information system.
Figure 5B:
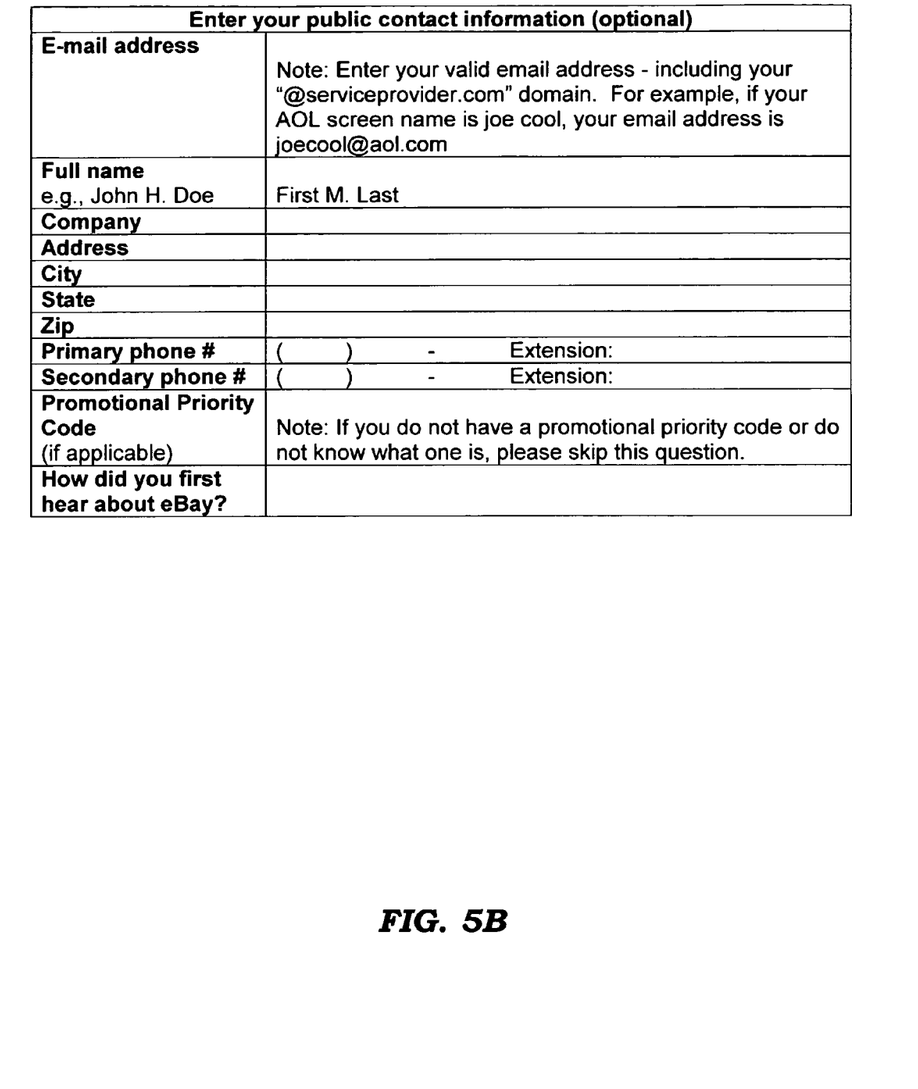

In preferred embodiments of the invention, when a user is prompted to enter private contact information, a number of fields are presented to the user, as shown in FIG. 5A. These fields include the user's e-mail address, name, company, address, city, state, zip code, primary phone number, secondary phone number, promotional priority code, and a "How did you first hear about eBay?" field. In preferred embodiments, the following fields are required: e-mail address, name, address, city, state, zip code, and primary phone number. Private contact information, therefore, comprises substantially the same information as currently existing user contact information.

Figure 5C:
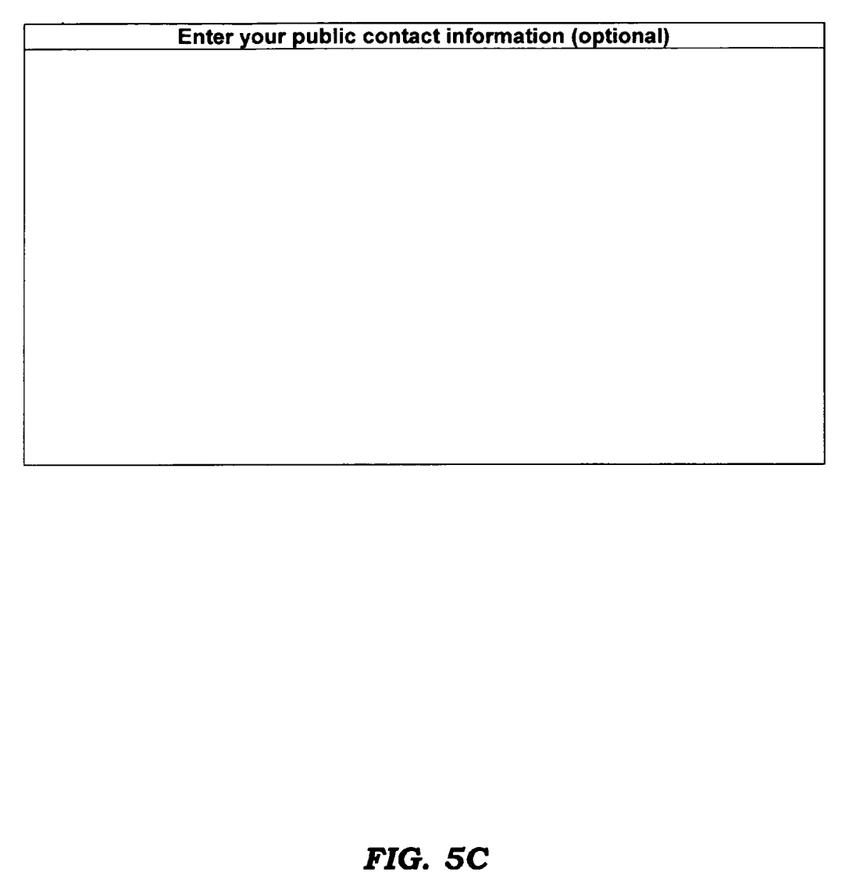

When a user is prompted to optionally enter public contact information, as shown in FIG. 5B, the user is prompted to enter the same fields as those presented in the private contact information, in one embodiment. However, since public contact information is optional, all of the fields in the public contact information may also be optional. Of course, there can be many variations of this. For example, if a user chooses to enter any public contact information, the user's name can be made a required field. In an alternative embodiment, public contact information is preferably presented as a free-form text field (FIG. 5C). In the free-form text field, a user can type in public contact information (i.e., post office box address, alternate phone number), or any other information that the user would like published (i.e., seller's return policies, shipping terms).

One or more new fields are added to the HTML document for the registration Web page, which depends on whether the single free-form text field is implemented. If public contact information is implemented requiring multiple fields in similar fashion to private contact information, then multiple fields are added to the HTML document. If, however, public contact information is implemented in a single-free form text field, then one new field is added to the HTML document. The one or more new fields are then stored in a user information file, such as user table 200.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

While preferred embodiments of the present invention have been discussed in the context of an Internet-based auction facility, the invention should not be construed as being limited to transactions over the Internet, or to auction-based transactions. Instead, the invention can have application in other contexts. For example, a dual online registration contact information system can have application in traditional retail-based transactions, where a seller offers goods for sale, and a buyer directly purchases (rather than bids on) those goods. Furthermore, there is no requirement that transactions involving the present invention be Internet-based. The transactions can involve any type of network, including a WAN, LAN, or POTS network.

Furthermore, while this invention has additionally been described in the context of public information, it should be understood that the term 'public' as used in this context generally comprises any non-private group. Thus, the public can comprise the general public (i.e., anyone who can access ebay.com), as well as any sub-groups of the general public (i.e., only registered users of ebay.com).

The invention claimed is:

1. A machine-readable medium having stored thereon data representing sequence of instructions, the sequences of instructions which, when executed by a processor, cause the processor to:
   provide a user with a private contact information area for storing private contact information, and a public contact information area for storing public contact information; and
   store private contact information, and, store public contact information; and
   display public contact information for the given user in response to a request for user contact information.

2. A machine-readable medium as in claim 1, wherein the private contact information area comprises a first plurality of fields for entering data supplied by the user as the private contact information, and wherein the public contact information area comprises a second plurality of fields for entering data supplied by the user as the public contact information.

3. A machine-readable medium as in claim 1, wherein the fields in the public contact information area comprise the same fields as the fields in the private contact information area.

4. A machine-readable medium as in claim 1, wherein the public contact information area comprises a single free-form text field.

5. A machine-readable medium as in claim 1, wherein the apparatus is implemented in an auction facility.

6. A machine-readable medium as in claim 5, wherein the auction facility is Internet-based.

7. A machine-readable medium as in claim 1, wherein the instruction to display the public contact information for the given user is to display public contact information for the given user in response to a request for user contact information for the given user.

8. A machine-readable medium as in claim 1, wherein the private contact information comprises first contact information identified by the given user as private contact information, and wherein the public contact information comprises second contact information identified by the given user as public contact information.

9. A machine-readable medium having stored thereon data representing sequences of instructions, the sequences of instructions which, when executed by a processor, cause the processor to:
- provide a user with a private contact information area for storing private contact information that the user intends not be published and a public area for storing public contact information that the user intends to be published;
- store private contact information, and, optionally, store public contact information for the user; and
- provide public contact information for the user.

10. A machine-readable medium as in claim 9, wherein the instruction to display public contact information for the user is to display public contact information for the user in response to a request for user contact information for the given user.

11. A machine-readable medium as in claim 9, wherein providing the public contact information for the user comprises displaying the public contact information.

12. A machine-readable medium as in claim 9, wherein the private contact information area comprises a first field for entering first information for use as the private contact information, and wherein the public contact information area comprises a second field for entering second information for use as the public contact information.

13. A method for securely processing a request for user contact information, comprising:
- providing a Internet auction user with a private contact information area for storing private contact information, and a public contact information area for storing public contact information;
- storing the private contact information, and, storing the public contact information for the internet auction user; and
- displaying public contact information corresponding to the Internet auction user.

14. A method as in claim 13, wherein said displaying public contact information corresponding to the Internet user comprises displaying public contact information corresponding to the Internet auction user in response to a request for user contact information for the Internet auction user.

15. A method as in claim 13, wherein the private contact information comprises first contact information identified by the given user as private contact information, and wherein the public contact information comprises second contact information identified by the given user as public contact information.

16. A method for dual online registration of contact information, whereby a user can selectively limit access to certain information, the method comprising:
- providing a private contact information area for receiving first contact information supplied by a user as private contact information;
- providing a public contact information area for receiving second contact information supplied by the user as public contact information; and
- providing the public contact information in response to a request for user contact information the given user, if the public contact information is available.

* * * * *

UNITED STATES PATENT AND TRADEMARK OFFICE
CERTIFICATE OF CORRECTION

PATENT NO.        : 7,127,404 B1                                                 Page 1 of 1
APPLICATION NO.   : 09/569331
DATED             : October 24, 2006
INVENTOR(S)       : Alex Poon     It is certified that error appears in the above-identified patent and that said Letters Patent is hereby corrected as shown below:

Claim 16, Column 8, line 37, insert --for-- before "the given user".

Signed and Sealed this

Sixth Day of March, 2007

JON W. DUDAS
*Director of the United States Patent and Trademark Office*